A. A. Young.
Hair Brush and Comb.
Nº 79,621. Patented Jul. 7, 1868.
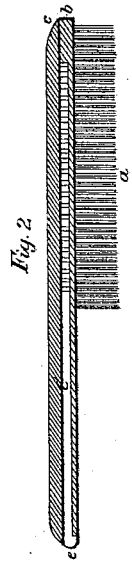
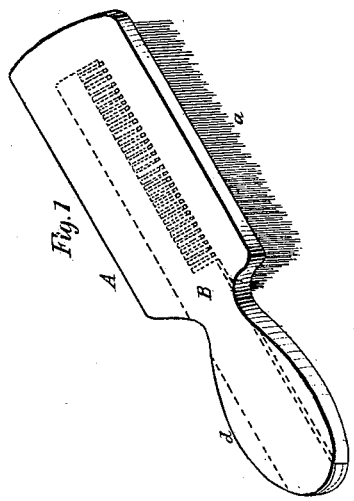

United States Patent Office.

ALBERT A. YOUNG, OF BOSTON, MASSACHUTETTS, ASSIGNOR TO HIMSELF AND FRANCIS McLAUGHLIN, OF SAME PLACE.

Letters Patent No. 79,621, dated July 7, 1868.

IMPROVED BRUSH AND COMB COMBINED.

*The Schedule referred to in these Letters Patent and making part of the same.*

TO ALL WHOM IT MAY CONCERN:

Be it known that I, ALBERT A. YOUNG, of Boston, in the county of Suffolk, and State of Massachusetts have invented a new and improved Hair-Brush and Comb; and I hereby declare that the following is a full and exact description of the same, and reference is made to the accompanying drawings, and to the letters marked thereon, making a part of this specification, of which—

Figure 1 is a perspective view of the brush and comb enclosed, and

Figure 2 is a longitudinal section of the same.

The letter A represents the brush, B the comb, and C the space for the comb when enclosed in the stalk of the brush. $a$ represents the bristles, $b$ the lower part of the stalk of the brush, $c$ the upper part or back of the same, $d$ the handle, and $e$ the knob or shelf, on the end of the comb, to draw out the same when it is to be used.

The invention is a hair-brush, having within its stalk, or the body part of the brush, a space for a comb, and a comb enclosed within this space, the comb being in no way attached to the brush as a part of it, and the case being a protection for the comb; the whole device being a compact, safe, and convenient form of keeping and transporting the brush and comb.

The accompanying drawings show the brush, the space for the comb, and the comb enclosed within the stalk of the brush.

The brush is made in the ordinary way of making hair-brushes, with the exception of the space in the stalk and handle. The bristles $a$ are secured to the lower part of the stalk $b$, as in ordinary cases; the upper part or back of the stalk, $c$, has a mortise or channel, constituting the space, C, formed within it, extending also through the handle, $d$, and is of sufficient dimensions to admit a comb of any size and description desirable. On the under side of the handle, at its extremity, the end is shortened to admit the knob or shelf, on the handle of the comb, though this may not be necessary. The back, $c$, is glued or fastened to the part $b$ of the brush. The comb, B, is made either with or without a handle, but is independent of any part of the brush, having a knob or shelf, $e$, or any suitable device for withdrawing the comb from the brush when to be used.

This device will be of great convenience to persons travelling, when space is of account. The comb enclosed is safe from damage in packing and transporting. When withdrawn from the brush, both brush and comb are independent, and are used separately.

I am aware that brushes have been made with combs riveted to the ends of the handles, opening and shutting laterally, like the blade of a knife. These brushes are of little consequence; the comb being attached to the brush-handle, the body of the brush, bristles and all, must be used as a handle to the comb.

This invention will afford much convenience, with trifling cost added to brush and comb.

What I claim as my invention, and desire to secure by Letters Patent, is—

A hair-brush, having a space in its stalk and handle, or either of them, for a comb, the comb being detachable from the stalk and handle when in use, and said space opening at the extremity of the handle or the end of the stalk, substantially as described.

I claim, also, the combination and arrangement of the brush A and the comb B, whereby the comb is protected in the stalk of the brush when not in use, substantially as described.

ALBERT A. YOUNG.

Witnesses:
    J. L. NEWTON,
    E. W. NEWTON.